United States Patent [19]
Grisar et al.

[11] 3,890,445
[45] June 17, 1975

[54] LACTAMIMIDE DERIVATIVES USEFUL AS HYPOGLYCEMIC AGENTS

[75] Inventors: J. Martin Grisar; George P. Claxton; Thomas R. Blohm, all of Cincinnati, Ohio

[73] Assignee: Richardson-Merrell Inc., Wilton, Conn.

[22] Filed: Mar. 22, 1974

[21] Appl. No.: 453,566

Related U.S. Application Data

[62] Division of Ser. No. 321,160, Jan. 5, 1973, Pat. No. 3,816,457.

[52] U.S. Cl. ............... 424/275; 424/267; 424/274; 424/285
[51] Int. Cl. ........................................... A61k 27/00
[58] Field of Search .......... 424/275, 285, 274, 244, 424/267

[56] References Cited
UNITED STATES PATENTS
3,344,153 9/1967 Kuhle et al. ..................... 260/347.2

*Primary Examiner*—Frederick E. Waddell
*Attorney, Agent, or Firm*—L. Ruth Hattan; Eugene O. Retter; George W. Rauchfuss, Jr.

[57] ABSTRACT

The lactamimide derivatives of this invention useful as hypoglycemic agents are represented by the formula

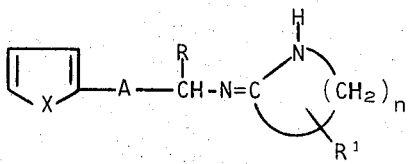

wherein X represents oxygen or sulfur; A represents a bond, or a straight or branched alkylene chain of from 1 to 3 carbon atoms; R represents hydrogen, a straight or branched lower alkyl group of from 1 to 4 carbon atoms, a straight or branched lower alkenyl group of from 3 to 6 carbon atoms, a cycloalkyl group of from 3 to 6 carbon atoms or phenyl; $R^1$ represents hydrogen or a straight or branched lower alkyl group of from 1 to 4 carbon atoms; $n$ is an integer of from 3 to 11; and pharmaceutically acceptable acid addition salts and individual optical isomers of the compounds where applicable.

9 Claims, No Drawings

LACTAMIMIDE DERIVATIVES USEFUL AS HYPOGLYCEMIC AGENTS

This is a division of application Ser. No. 321,160, filed Jan. 5, 1973 now U.S. Pat. No. 3,816,457 issued June 11, 1974.

FIELD OF THE INVENTION

This invention relates to novel lactamimide derivatives useful as hypoglycemic agents and to methods of using the compounds either alone or in the form of pharmaceutical preparations.

SUMMARY OF INVENTION

Lactamimide derivatives of the following Formula I and pharmaceutically acceptable acid addition salts and individual optical isomers where applicable are useful as hypoglycemic agents.

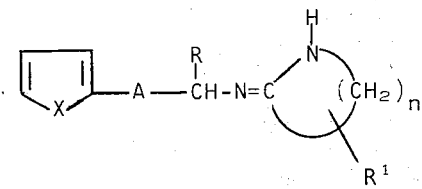

Formula I

In the above Formula I, X represents oxygen or sulfur; A represents a bond or a straight or branched alkylene chain of from 1 to 3 carbon atoms; R represents hydrogen, or a straight or branched lower alkyl group from 1 to 4 carbon atoms, a straight or branched lower alkenyl group of from 3 to 6 carbon atoms, cycloalkyl of from 3 to 6 carbon atoms or phenyl; $R^1$ represents hydrogen or a straight or branched lower alkyl group of from 1 to 4 carbon atoms; and $n$ is an integer of from 3 to 11. Pharmaceutically acceptable acid addition salts and individual optical isomers of the compounds where applicable are also included within the scope of this invention.

DETAILED DESCRIPTION OF INVENTION

For convenience and uniformity all the compounds of this invention are named and represented as 2-iminoperhydroazacarbocyclics, as represented by general Formula I. It is well known, however, that compounds of this type may also be represented by the tautomeric form illustrated by the following Formula II:

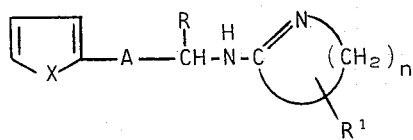

Formula II

This tautomerism has been discussed by R. Kowk and P. Pranc, J. Org. Chem. 32, 740(1967). The compounds of this invention when represented by Formula II will be named differently than when represented by Formula I. In solution under the conditions of therapeutic utility the proportion of each tautomeric form, or the delocalization of the charge between the two nitrogens, will be dependent upon numerous factors including the nature of the substituents, the pH of the medium, and the like. This equilibrium state is conveniently depicted by the following Formula III.

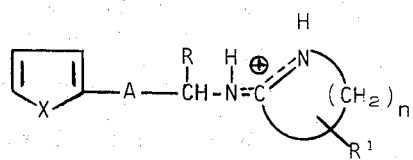

Formula III

In the above Formulas II and III X, A, R, $R^1$ and $n$ have the meanings defined hereinbefore.

As examples of straight or branched lower alkyl groups of from 1 to 4 carbon atoms which R and $R^1$ may represent in the above Formulas I to III there may be mentioned methyl, ethyl, propyl, isopropyl, butyl, tertbutyl, and the like.

As examples of cycloalkyl groups of from 3 to 6 carbon atoms which R may represent in the above Formulas I to III there may be mentioned cyclopropyl, cyclobutyl, cyclopentyl and cyclohexyl.

As examples of alkenyl groups of from 3 to 6 carbon atoms which R may represent in the above Formulas I to III there may be mentioned allyl, 2-butenyl, 3-butenyl, 3-pentenyl, and the like.

Pharmaceutically acceptable acid addition salts of the base compounds of this invention are those of any suitable inorganic or organic acids. Suitable inorganic acids are for example, hydrochloric, hydrobromic, sulfuric or phosphoric acids, and the like. Suitable organic acids are, for example, carboxylic acids such as acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, salicylic, 2-phenoxybenzoic, and the like, or sulfonic acids such as methane sulfonic, 2-hydroxyethane sulfonic acid and the like.

As examples of compounds of this invention there may be mentioned:
2-[[α-(2-thienyl)benzyl]imino]azacyclotridecane,
hexahydro-2-(2-thenylimino)azepine,
hexahydro-2-[1-(2-thenyl)propylimino]azepine,
2-(furfurylimino)hexahydroazepine,
2-[[α-(2-furyl)benzyl]imino]octahydroazocine,
hexahydro-2-[[α-(2-thienyl)benzyl]imino]azepine,
2-[1-(2-thenyl)propylimino]pyrrolidine,
2-[(α-cyclopropyl-2-thenyl)imino]hexahydroazepine,
hexahydro-2-[β-(2-thienyl)isopropylimino]azepine,
hexahydro-2-[2-(3-[2-thienyl]butyl)imino]azepine,
hexahydro-2-[2-(1-[2-thienyl]pent-4-enyl)imino]azepine,
2-[2-(1-[2-furyl]pent-4-enyl))imino]azacyclododecane,
2-[(α-[2-thienyl]benzyl)imino]piperidine,
5-tert-butylhexahydro-2-[1-(2-thienyl)-2-butylimino]-azepine,
2-[(α-cyclopropyl-2-thenyl)imino]piperidine,
octahydro-2-[(α-[2-thienyl]benzyl)imino]azocine,
octahydro-2-[1-(2-thienyl)-2-butylimino]azocine,
2-[(α-cyclopropyl-2-thenyl)imino]octahydroazocine,
2-[1-(2-thienyl)-2-butylimino]piperidine,
octahydro-2-[1-(2-thienyl)-2-butylimino]azonine,
2-[(α-[2-furyl]benzyl)imino]hexahydroazepine,
2-[(α-[2-furyl]benzyl)imino]piperidine,
hexahydro-2-(3-[4-(2-furyl)-4-cyclopentyl]butylimino)-azepine,
2-(2-thenylimino)azacycloundecane, 5-n-propylhexahydro-2-(2-[1-(2-furyl)hex-4-enyl]imino)-azepine, and the like and pharmaceutically acceptable acid addition salts thereof.

The compounds of this invention are useful as hypoglycemic agents and may be used to control hyperglycemic conditions, such as occur for example in diabetic patients, by inducing a hypoglycemic response in the patient. To illustrate the utility of the compounds of this invention male rats of the Charles River C.D. strain each weighing from 120 to 140 grams were fasted for 15 hours then injected subcutaneously with 1 g/kg of body weight of glucose in 0.5 ml of 0.9% sodium chloride solution. Immediately following the glucose injection the animals were administered by oral intubation a compound of this invention in 0.5 ml of carboxymethyl cellulose. Two hours after the test compound was administered blood was withdrawn from the animals and a quantitative analysis of glucose in the plasma was performed by use of the ultramicro glucose oxidase procedure as described by L. P. Cawley et al., Am. J. Clin. Path. 32, 195–200 (1959). Animals administered carboxymethyl cellulose with no test compound served as a control. The results of this test are summarized in the following Table I.

Table I

| Test Compound | Dosage mg/kg | % Reduction in plasma glucose from control |
| --- | --- | --- |
| octahydro-2-[1-(2-thienyl)-2-butylimino]azonine hydrochloride | 100 | 68 |
| | 12.5 | 31 |
| hexahydro-2-[2-(1-[2-thienyl]pent-4-enyl)-imino]azepine hydrochloride | 100 | 65 |
| | 50 | 49 |
| 2-[(α-[2-furyl]benzyl)-imino]hexahydroazepine hydrochloride | 100 | 55 |
| | 50 | 37 |
| hexahydro-2-[2-(3-[2-thienyl]butyl)imino]-azepine hydrochloride | 100 | 46 |
| 2-[(α-cyclopropyl-2-thenyl)imino]hexahydroazepine hydrochloride | 100 | 44 |
| hexahydro-2-[[α-(2-thienyl)benzyl]imino]-azepine hydrochloride | 100 | 50 |
| | 50 | 46 |
| 2-[[α-(2-furyl)benzyl]-imino]octahydroazocine hydrochloride | 100 | 51 |

These novel compounds can be administered to animals, warm blooded animals and particularly mammals, either alone or in the form of pharmaceutical preparations which contain the novel compounds suitable for oral or parenteral administration. Pharmaceutical preparations containing novel compounds of this invention and conventional pharmaceutical carriers can be employed in unit dosage forms such as solids, for example, tablets and capsules, or liquid solutions, suspensions or elixirs for oral administration, or liquid solutions, suspensions, emulsions, and the like for parenteral administration. The quantity of compound administered can vary over a wide range to provide from about 0.1 mg/kg (milligram per kilogram) to about 100 mg/kg of body weight of the patient per day to achieve the desired effect. Unit doses of these compounds can contain from about 5 to 500 mg of the compound and may be administered, for example, from 1 to 4 times daily. Specific Examples 25 to 28 are illustrative of pharmaceutical preparations containing as active ingredients compounds of this invention.

The compounds of this invention may be prepared by reacting an excess of a lactim ether of the formula

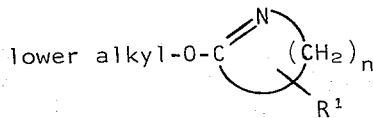

Formula IV with a primary amine of the following formula

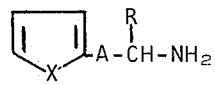

Formula V in a manner similar to that reported by R. E. Benson and T. L. Cairns in J. Am. Chem. Soc. 70, 2115–8 (1948). The various symbols X, A, R, R¹ and n have the meanings defined hereinbefore. This reaction may be carried out with or without a solvent. When a solvent is employed that preferred is a lower alcohol, such as methanol, ethanol, isopropyl alcohol, butanol and the like. Other solvents, such as, aromatic hydrocarbons, for example, benzene and toluene may also be used as suitable solvents for this reaction. A basic or an acidic catalyst such as a tertiary amine or hydrogen chloride may be added to the reaction mixture. In general it is preferred that the hydrochloride salt of the amine be used in the reaction. The temperature of the reaction varies from −40° to 180°C, and the preferred temperature is about 15°–25°C. The reaction time varies from 1 hour to about 60 days being dependent upon the temperature of the reaction, the reactant primary amine, and more particularly on the degree of steric hindrance of the amines since highly sterically hindered amines react very slowly.

The lactim ethers as represented by Formula IV which find use in this reaction may be prepared from commercially available corresponding lactams by methods known in the art. For example, by reaction of an appropriate lactam with dimethyl sulfate in a solvent such as benzene, toluene, xylene or the like at the reflux temperature of the solvent for 2–24 hours the corresponding O-methyl lactim ether is obtained.

The amines as represented by Formula V which find use in this reaction may be prepared by several methods known to the art. For example, a nitrile of the formula

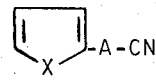

Formula VI may be reacted with an alkyl- or phenylmagnesium halide compound followed by reduction of the resulting ketimine complex in situ with lithium aluminum hydride. Also, nitriles of the formula

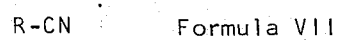

R-CN    Formula VII particularly wherein R is a cycloalkyl group of from 3 to 6 carbon atoms, may be reacted with 2-thienylmagnesium halide followed by reduction. In some instances it may be advantageous to prepare the primary amines from compounds of the formula

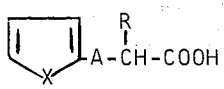

Formula VIII via Hoffman or Curtius degradation, such as described by F. J. McCarty, et al., J. Med. Chem. 11, 534 (1968), or as described by Van Zoeren in U.S. pat. No. 2,367,702.

The compounds of this invention may also be prepared using a complex of an appropriate lactam of the formula

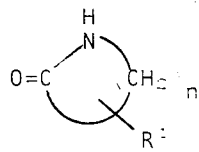

Formula IX wherein $n$ and $R^1$ have the meaning defined above, with phosphorus oxychloride, phosgene, borontrifluoride etherate, dimethylsulfate, hydrogen halide or a combination of two or more such reagents. Several attempts have been made to formulate the structure of these complexes, and one formulation includes the imino halide, that is, 2-chloro-4,5,6,7-tetrahydro-3$\underline{H}$-azepine. However, none of the formulations have been unambiguously established. This reaction has been studied by H. Bredereck in a series of articles in Chem. Ber., 1953–1968, particularly in vol. 94, 2278 (1961) and vol. 97, 1403 (1964). The complex formed is reacted with an appropriate primary amine described hereinabove in an aromatic hydrocarbon solvent such as benzene, toluene or xylene or an alkyl polyhalide solvent such as carbon tetrachloride, chloroform, methylene chloride, dichloroethane, tetrachloroethylene or the like. The reaction temperature is limited by the boiling point of the solvent, however, in some cases it is advantageous to carry out the reaction at room temperature or with cooling at 0° to −40°C depending on the reactants.

Similarly the above reaction may be carried out by using known thiolactim ethers such as S-methylthiocaprolactim [H. Behringer and H. Meier, Ann. 607, 73–91 (1957)], or by using thiolactams wherein the latter case it may be advantageous to employ a catalyst such as mercury or silver oxide or cyanide [J. Gautier and J. Renault, C.R. Acad. Sci. 234, (1952)].

Also by catalytic hydrogenation of an appropriate amino-pyridine derivative as described by T. Grave, J. Am. Chem. Soc. 46, 1460 (1924), M. Friefelder et al., J. Org. Chem. 29, 3730 (1964) and L. Birkhofer, Ber. 75, 429 (1942), compounds of this invention containing a pentamethyleneimine moiety may be obtained.

The following specific examples are illustrative of the invention.

EXAMPLE 1

2-[[α-(2-Thienyl)benzyl]imino]azacyclotridecane hydrochloride

To 6.4 g (0.033 mole) of 2-azacyclotridecanone in 100 ml of benzene is added 4.8 g (0.031 mole of phosphorus oxychloride. The mixture is stirred at room temperature for 4 hours after which 6.5 g (0.029 mole) of α-(2-thienyl)benzylamine hydrochloride is added. Stirring is continued at room temperature for 1 hour then at reflux temperature for 4 hours. The resulting solution is allowed to cool to room temperature and stand over night after which is is washed with 2N hydrochloric acid. The organic layer is separated and washed with a saturated sodium chloride solution and dried over sodium sulfate. The solvent is evaporated, and the resulting oil is crystallized and recrystallized from isopropyl alcohol-water to give 2-[[α-(2-thienyl)benzyl]imino]azacyclotridecane hydrochloride, M.P. 150°–160°C (dec).

EXAMPLE 2

Hexahydro-2-(2-thenylimino)azepine hydrochloride

A solution of 11.2 g (0.0995 mole) of 2-thenylamine in 700 ml of ether is acidified with ethereal hydrochloric acid after which the precipitate is collected and dried to give 2-thenylamine hydrochloride.

A mixture of 15.1 g (0.101 mole) of the above obtained 2-thenylamine hydrochloride, 15 ml of O-methylcaprolactim and 5 ml of ethanol is stirred with cooling under tap water until the exothermic reaction is complete. The mixture is allowed to stand at room temperature for about 4 hours with occasional stirring and the addition of sufficient ethanol to prevent the mixture from solidifying. The mixture is then cooled to −20°C after which the precipitate is collected, recrystallized from acetonemethanol and dried to give hexahydro-2-(2-thenylimino)azepine hydrochloride, M.P. 207°–209°C (dec),

EXAMPLE 3

Hexahydro-2-[1-(2-thenyl)propylimino]azepine hydrochloride

A mixture of 12 g (0.0625 mole) of 1-(2-thenyl)-1-propylamine hydrochloride and about 15 ml of O-methylcaprolactim is allowed to stand at room temperature for 8 days with occasional stirring and the addition of sufficient absolute ethanol to prevent solidification of the mixture. The mixture is cooled to −20°C, then the precipitate is collected, washed with ether, air dried and recrystallized from acetone-methanol to give hexahydro-2-[1-thenylpropylimino]azepine hydrochloride, M.P. 187°–187.5°C.

Following the general procedure of Example 3 only substituting for 1-[(2-thenyl)-1-propylamine hydrochloride and O-methylcaprolactim respectively the amine hydrochloride and lactim ether listed in the following Table II the respective compounds as listed are obtained.

Table II

| Ex. No. | Compound Name, M.P.°C | Amine HCl | Lactim ether | Reaction Time |
| --- | --- | --- | --- | --- |
| 4 | 2-[[α-(2-Furyl)benzyl]imino]-octahydroazocine hydrochloride, 255–256 (dec.) | α-(2-furyl)-benzylamine | O-methylenantholactim | 7 days |
| 5 | Hexahydro-2-[[α-(2-thienyl)-benzyl]imino]azepine hydrochloride, 255–256 (dec.) | α-(2-thienyl)-benzylamine | O-methylcaprolactim | 7 days |

Table II – Continued

| Ex. No. | Compound Name, M.P.°C | Amine HCl | Lactim ether | Reaction Time |
|---|---|---|---|---|
| 6 | 2-[1-(2-Thenyl)propylimino]-pyrrolidine hydrochloride, 109–111 (dec.) | 1-(2-thienyl)-2-butylamine | O-methylbutyro-lactim | 29 days |
| 7 | 2-[(α-Cyclopropyl-2-thenyl)-imino]hexahydroazepine hydrochloride, 207–209 | α-cyclopropyl-2-thenylamine | O-methylcapro-lactim | 7 days |
| 8 | Hexahydro-2-[β-(2-thienyl)-isopropylimino]azepine hydrochloride, 177.5–180 | β-(2-thienyl)-isopropylamine | O-methylcapro-lactim | 3 days |
| 9 | Hexahydro-2-[2-(3-[2-thienyl]-butyl)imino]azepine hydrochloride, 188–193 | 3-(2-thienyl)-butylamine | O-methylcapro-lactim | 6 days |
| 10 | Hexahydro-2-[2-(1-[2-thienyl]-pent-4-enyl)imino]azepine hydrochloride, 143–146 | 2-[1-(2-thienyl)pent-4-enyl]amine | O-methylcapro-lactim | 7 days |
| 11 | 2-[(α-[2-Thienyl]benzyl)imino]-piperidine hydrochloride, 198–200 | α-(2-thienyl)-benzylamine | O-methylvalero-lactim | 8 days |
| 12 | 5-tert-Butylhexahydro-2-[1-(2-thienyl)-2-butylimino]azepine hydrochloride, 223–226 | 1-(2-thienyl)-2-butylamine | O-methyl-5-(tert-butyl)caprolactim | 8 days |
| 13 | 2-[(α-Cyclopropyl-2-thenyl)-imino]piperidine hydrochloride, 172–174 | α-cyclopropyl-2-thenylamine | O-methylvalero-lactim | 12 days |
| 14 | Octahydro-2-[(α-[2-thienyl]-benzyl)imino]azocine hydrochloride, 280–281 | α-(2-thienyl)-benzylamine | O-methylenantho-lactim | 8 days |
| 15 | Octahydro-2-[1-(2-theinyl)-2-butylimino]azocine hydrochloride, 188–190 | 1-(2-thienyl)-2-butylamine | O-methylenantho-lactim | 10 days |
| 16 | 2-[(α-Cyclopropyl-2-thenyl)-imino]octahydroazocine hydrochloride, 202–204 | α-cyclopropyl-2-thenylamine | O-methylenantho-lactim | 21 days |
| 17 | 2-[1-(2-Thienyl)-2-butylimino]-piperidine hydrochloride, 134–136 | 1-(2-thienyl)-2-butylamine | O-methylvalero-lactim | 13 days |
| 18 | Octahydro-2-[1-(2-thienyl)-2-butylimino]azonine hydrochloride, 173–175 | 1-(2-thienyl)-2-butylamine | O-methylcapryl-lactim | 12 days |
| 19 | 2-[(α-[2-Furyl]benzyl)imino]-hexahydroazepine hydrochloride 216–218 | α-(2-furyl)-benzylamine | O-methylcapro-lactim | 4 days |
| 20 | 2-[(α-[2-Furyl]benzyl)imino]-piperidine hydrochloride, 169–171 | α-(2-furyl)-benzylamine | O-methylvalero-lactim | 8 days |

EXAMPLE 21

2-(Furfurylimino)hexahydroazepine hydrochloride

A solution of 17.8 g (0.183 mole) of furfurylamine in 700 ml of ether is acidified with ethereal hydrochloric acid after which the precipitate is collected and dried to give furfurylamine hydrochloride, M.P. 138.5°–140°C.

A mixture of the above obtained furfurylamine hydrochloride and 30 ml of O-methylcaprolactim is allowed to stand at room temperature for 2 days with occasional stirring and the addition of sufficient ethanol to prevent the mixture from solidifying. The mixture is then cooled to −20°C then the precipitate collected and recrystallized from methanol-acetone to give 2-(furfurylimino)hexahydroazepine hydrochloride, M.P. 149.5°–150.5°C.

EXAMPLE 22

2-(Furfurylimino)azacycloundecane hydrochloride

Following the procedure of Example 1 only substituting for 2-azacyclotridecanone and α-(2-thienyl)benzylamine hydrochloride appropriate amounts of 2-azacycloundecanone and furfurylamine hydrochloride respectively, 2-(furfurylimino)azacycloundecane hydrochloride is obtained.

EXAMPLE 23

O-Methylvalerolactim

To a refluxing solution of 100 g (1.01 moles) of valerolactim in 350 ml of dry benzene is added dropwise 125 g (0.99 mole) of dimethyl sulfate. After refluxing overnight the mixture is treated with saturated potassium carbonate solution, dried and the solvent is evaporated. The product is distilled at 20 mm, B.P. 55°–57°C.

EXAMPLE 24

Following the procedure of Example 22 only substituting valerolactam, the appropriate molar equivalent amount of butyrolactam, caprolactam, enantholactam, caprylolactam, and 5-tert-butylcaprolactam the following respective compounds are obtained.

O-methylbutyrolactim, B.P. 65°–67°C (100 mm),
O-methylcaprolactim, B.P. 60°–65°C (13.0 mm),
O-methylenantholactim, B.P. 48°–53°C (2.0 mm),
O-methylcaprylolactim, B.P. 44°–46°C (0.5 mm),
O-methyl-5-tert-butylcaprolactim, B.P. 76°–79°C (0.4–2.3 mm),

EXAMPLE 25

An illustrative composition for tablets is as follows:

Per Tablet (a) octahydro-2-[1-(2-thienyl)-2-butylimino]azonine hydro-

| | | |
|---|---|---|
| | chloride | 100 mg |
| (b) | wheat starch | 15 mg |
| (c) | lactose | 33.5 mg |
| (d) | magnesium stearate | 1.5 mg |

A granulation obtained upon mixing lactose with the starch and granulated starch paste is dried, screened and mixed with the active ingredient (a) and magnesium stearate. The mixture is compressed in tablets weighing 150 mg each.

EXAMPLE 26

An illustrative composition for hard gelatin capsules is as follows:

| | | Per Capsule |
|---|---|---|
| (a) | hexahydro-2-[2-(1-[2-thienyl]-pent-4-enyl)imino]azepine hydrochloride | 150 mg |
| (b) | talc | 25 mg |

The formulation is prepared by passing the dry powders of (a) and (b) through a fine mesh screen and mixing them well. The powder is then filled into No. 0 hard gelatin capsules at a net fill of 175 mg per capsule.

EXAMPLE 27

An illustrative composition for pills is as follows:

| | | Per Pill |
|---|---|---|
| (a) | 2-[[α-(2-furyl)benzyl]imino]-octahydroazocine hydrochloride | 150 mg |
| (b) | corn starch | 120 mg |
| (c) | liquid glucose | 15 mg |

The pills are prepared by blending the active ingredient and starch then adding the liquid glucose with thorough kneading to form a plastic mass. The pills are then cut and formed from the plastic pill mass.

EXAMPLE 28

An illustrative composition for a parenteral injection is the following wherein the quantities are on a weight to volume basis.

| | | |
|---|---|---|
| (a) | 2-[(α-cyclopropyl-2-thenyl)imino]-hexahydroazepine hydrochloride | 100 mg |
| (b) | sodium chloride | q.s. |
| (c) | water for injection to make | 10 ml |

The composition is prepared by dissolving the active ingredient and sufficient sodium chloride in water for injection to render the solution isotonic. The composition may be dispensed in a single ampule containing 100 mg of the active ingredient for multiple dosage or in 10 ampules for a single dosage.

We claim:

1. A method of inducing a hypoglycemic response in a hyperglycemic patient which comprises administering orally or parenterally to said patient an effective amount of a compound selected from the base of the formula:

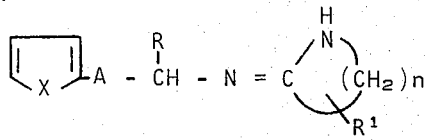

wherein X is selected from oxygen or sulfur; A is selected from the group representing a bond or a straight or a branched alkylene chain of from 1 to 3 carbon atoms; R is selected from the group consisting of hydrogen or a straight or branched lower alkyl group of from 1 to 4 carbon atoms, a straight or branched lower alkenyl group of from 3 to 6 carbon atoms, a cycloalkyl group of from 3 to 6 carbon atoms and phenyl; $R^1$ is selected from the group consisting of hydrogen or a straight or branched lower alkyl group of from 1 to 4 carbon atoms; and n is an integer of from 3 to 11; and a pharmaceutically acceptable acid addition salt thereof.

2. The method of claim 1 wherein the effective quantity of compound is from about 0.1 mg/kg to about 100 mg/kg of body weight of said patient per day.

3. The method of claim 2 wherein the compound is 2-[(α-[2-furyl]benzyl)imino]hexahydroazepine or a pharmaceutically acceptable acid addition salt thereof.

4. The method of claim 2 wherein the compound is 2-[[α-(2-furyl)benzyl]imino]octahydroazocine or a pharmaceutically acceptable acid addition salt thereof.

5. The method of claim 2 wherein the compound is octahydro-2-[1-(2-thienyl)-2-butylimino]azonine or a pharmaceutically acceptable acid addition salt thereof.

6. The method of claim 2 wherein the compound is hexahydro-2-[2-(1-[2-thienyl]-pent-4-enyl)imino]azepine or a phamaceutically acceptable acid addition salt thereof.

7. The method of claim 2 wherein the compound is hexahydro-2-[[α-(2-thienyl)benzyl]imino]azepine or a pharmaceutically acceptable acid addition salt thereof.

8. The method of claim 2 wherein the compound is 2-[(α-cyclopropyl-2-thenyl)imino]hexahydroazepine or a pharmaceutically acceptable acid addition salt thereof.

9. A pharmaceutical composition having hypoglycemic properties comprising in unit dosage form a significant quantity of a pharmaceutical carrier and from about 5 mg to 500 mg of a compound selected from a base of the formula:

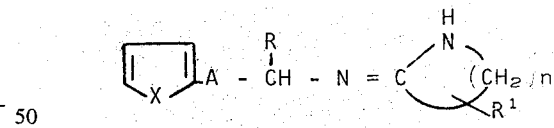

wherein X is selected from oxygen or sulfur; A is selected from the group representing a bond or a straight or branched alkylene chain of from 1 to 3 carbon atoms; R is selected from the group consisting of hydrogen or a straight or branched lower alkyl group of from 1 to 4 carbon atoms, a straight or branched lower alkenyl group of from 3 to 6 carbon atoms, a cycloalkyl group of from 3 to 6 carbon atoms and phenyl; $R^1$ is selected from the group consisting of hydrogen or a straight or branched lower alkyl group of from 1 to 4 carbon atoms; and n is an integer of from 3 to 11; and a pharmaceutically acceptable acid addition salt thereof.

* * * * *